United States Patent [19]

Ikoh

[11] Patent Number: 5,648,869
[45] Date of Patent: Jul. 15, 1997

[54] MICROSCOPE

[75] Inventor: Chikaya Ikoh, Yokohama, Japan

[73] Assignee: Nikon Corporation, Tokyo, Japan

[21] Appl. No.: 510,265

[22] Filed: Aug. 2, 1995

[30] Foreign Application Priority Data

Aug. 5, 1994 [JP] Japan ................... 6-204596

[51] Int. Cl.$^6$ .............................. G02B 7/02; G02B 21/00
[52] U.S. Cl. .................... 359/368; 359/380; 359/381; 359/384
[58] Field of Search .................... 359/363, 383, 359/368, 380, 381, 384, 821; 250/201.3

[56] References Cited

U.S. PATENT DOCUMENTS

| 4,486,078 | 12/1984 | Hashimoto et al. | 359/381 |
|---|---|---|---|
| 4,544,244 | 10/1985 | Moore | 359/381 |
| 4,695,437 | 9/1987 | Jörgens et al. | 359/383 |
| 4,961,636 | 10/1990 | Gaul et al. | 359/381 |
| 5,260,825 | 11/1993 | Nagano et al. | 359/368 |
| 5,276,550 | 1/1994 | Kojima | 359/368 |
| 5,337,177 | 8/1994 | Toyada et al. | 359/368 |
| 5,396,063 | 3/1995 | Ito et al. | 359/384 |
| 5,508,850 | 4/1996 | Noguchi | 359/384 |

FOREIGN PATENT DOCUMENTS 61-270719  12/1986  Japan ................... 359/368

Primary Examiner—Timothy P. Callahan
Assistant Examiner—T. Lam
Attorney, Agent, or Firm—Shapiro and Shapiro

[57] ABSTRACT

A microscope includes a revolver on which are mounted at least three objective lenses having different magnifications, a driving device for revolving the revolver to switch the objective lens disposed in an optical path of the microscope, an operating device capable of giving a plurality of drive commands for disposing a desired objective lens in the optical path of the microscope to the driving device and an invalidating element for invalidating a specified drive command among the drive commands. The specified drive command serves to switch the objective lens disposed in the optical path of the microscope from a first objective lens having a minimum magnification to a second objective lens having a maximum magnification among the objective lenses.

10 Claims, 5 Drawing Sheets

MICROSCOPE

BACKGROUND OF THE INVENTION

1. Field of the Invention

The present invention relates generally to a microscope and, more particularly, to an apparatus for controlling revolutions of a motor-driven revolver mounted with objective lenses.

2. Related Background Art

A revolver of a microscope generally has a plurality of objective lenses having different magnifications mounted thereon, which are disposed at fixed intervals on the circumference thereof in the sequence of the magnifications. As illustrated in FIG. 6, an objective lens L1 exhibiting a high magnification has a long lens barrel and a small focal depth D1. An objective lens L2 exhibiting a low magnification has a short lens barrel and a large focal depth D2.

For this reason, in a state such as observing a specimen in close proximity thereto by use of the objective lens L2 exhibiting low magnification and large focal depth, i.e., in an as-observed state where the specimen is disposed in a position P1 closer to the objective lens L2 than a focal plane FP of the objective lens, when the objective lens is abruptly switched over to the high-magnification objective lens, the front edge of the lens barrel of the objective lens may collide with the specimen. As a result, the lens is damaged, or the specimen, e.g., a wafer, is damaged.

More specifically, for example, addresses 1-5 are set sequentially in a clockwise direction in five objective lens mounting portions provided in a revolver. The objective lenses are mounted in these mounting portions in the sequence of the magnifications. That is, the objective lens having a minimum magnification is mounted in an address-1 mounting portion, while the objective lens having a maximum magnification is mounted in an address-5 mounting portion. When observing through the minimum-magnification objective lens if an operator carelessly operates to make a counterclockwise movement to change an observing magnification, it may happen that the front edge of the maximum-magnification lens collides with the specimen.

As explained above, in the conventional microscope, when the microscope operator carelessly gives a command to switch over the objective lens from the low-magnification objective lens to the high-magnification objective lens, the maximum-magnification objective lens collides with the specimen, with the result that the objective lens and the specimen are damaged. This happens particularly when the objective lens mounted in the revolver is changed from the minimum-magnification objective lens to the maximum-magnification objective lens. Accordingly, when changing the observing magnification (to a higher-magnification), the microscope operator needs to revolve the revolver while paying attention to this.

SUMMARY OF THE INVENTION

It is an object of the present invention, which was devised in view of the problems given above, to provide a microscope capable of preventing an objective lens exhibiting a maximum magnification from colliding with a specimen even by carelessly giving a command to perform a switchover from a minimum-magnification objective lens to a maximum-magnification objective lens. To obviate the problems, a microscope comprises a revolver on which are mounted at least three types of objective lenses having different magnifications, a driving device for revolving the revolver to switch over the objective lens disposed on an optical path of the microscope, an operating device capable of giving a plurality of drive commands for disposing a desired objective lens in the optical path of the microscope to the driving device and an invalidating element for invalidating a specified drive command among the drive commands. The specified drive command serves to switch over the objective lens disposed in the optical path of the microscope from a first objective lens having a minimum magnification to a second objective lens having a maximum magnification among the plurality of objective lenses.

In the microscope according to the present invention, there is invalidated a revolution command for switching over the objective lens in the optical path of the microscope from the minimum-magnification lens to the maximum-magnification lens among revolution commands given by an operator to the driving device through the operating device.

More specifically, the type of objective lens located in the optical path of the microscope is detected, and, if the minimum-magnification lens is located in the optical path, the revolution command is not transmitted to the revolver by cutting off a command-of-revolution signal even when the operating device outputs the command-of-revolution signal to the maximum-magnification lens.

Thus, in the microscope according to the present invention, even if there is carelessly given the command to switch over the objective lens from the minimum-magnification objective lens to the maximum-magnification objective lens, no revolution of the revolver is caused. Accordingly, it is possible to surely avoid a collision of the maximum-magnification objective lens with a specimen due to the careless switchover command. In other words, the operator of the microscope does not need to switch over the objective lens while paying special attention, and, therefore, operability of the microscope is improved.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be discussed with reference to the accompanying drawings.

Figure 1:
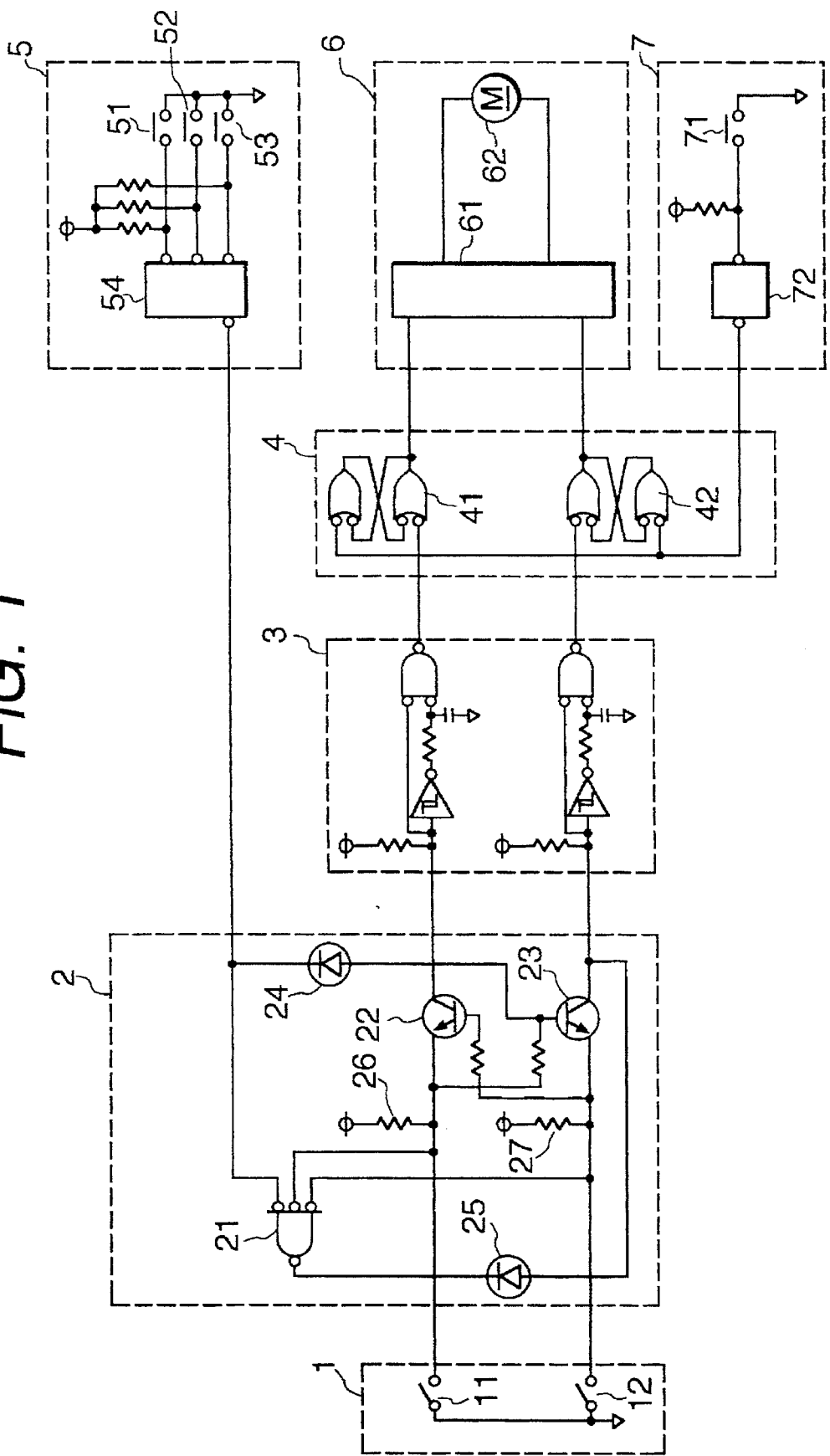
FIG. 1 is a block diagram illustrating an internal construction of a revolver controller of a microscope in accordance with a first embodiment of the present invention.
Figure 2B:
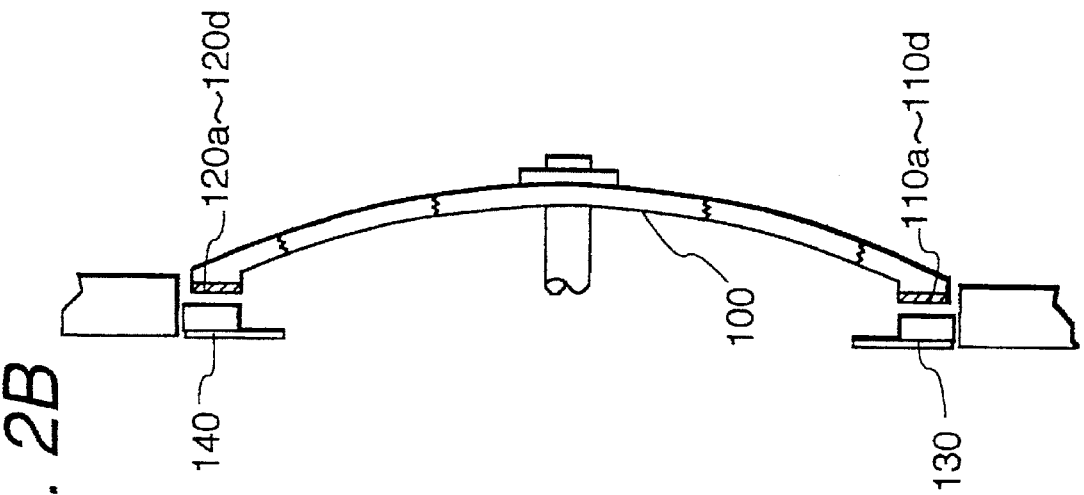
FIG. 2B is a sectional view taken substantially along the line 2B—2B on FIG. 2A.
Figure 2A:
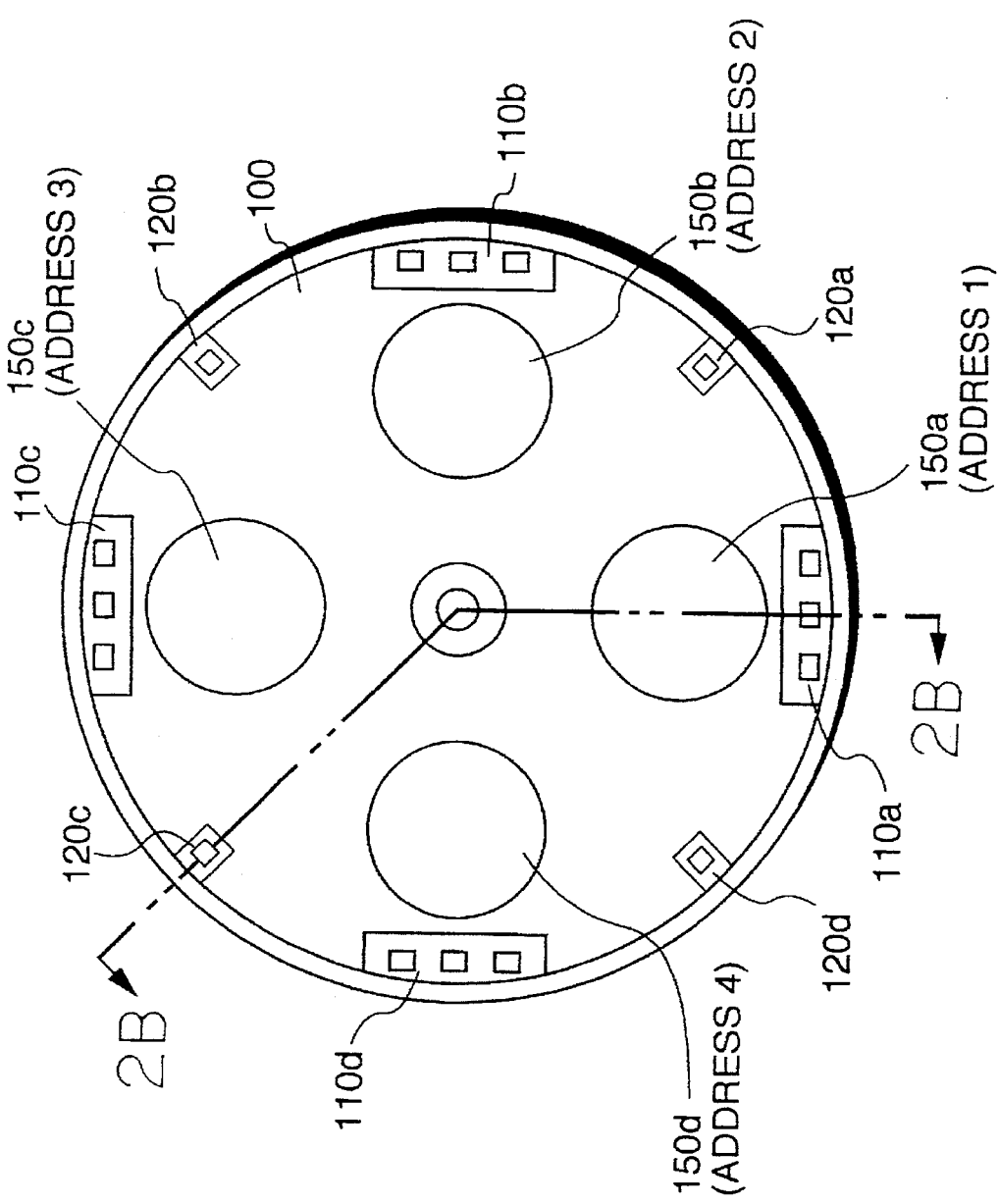
FIG. 2A is a view schematically illustrating a configuration of a revolver in the first embodiment.

FIG. 1 is a block diagram illustrating an internal construction of a revolver controller of a microscope in accordance with a first embodiment of the present invention. Further, FIG. 2A is a plan view schematically illustrating a configuration of a revolver. FIG. 2B is a sectional view taken along the line 2B—2B on FIG. 2A.

As depicted in FIG. 2A, a knurl 100 serving as a body of the revolver includes four mounting portions 150a–150d provided at equal intervals, in which addresses are sequentially set. Four objective lenses having magnifications different from each other are mounted in these mounting portions 150a–150d in a peripheral direction in the sequence of the magnifications. In accordance with this embodiment, it is assumed that the objective lens having a minimum magnification is mounted in the address-1 mounting portion 150a; the objective lenses are mounted in the address-2 mounting portion 150b and the address-3 mounting portion 150c so that the magnification becomes gradually larger; and, thus, the objective lens having a maximum magnification is mounted in the address-4 mounting portion 150d. Note that each objective lens is so mounted as to protrude from a convex surface of the knurl 100 as seen in FIG. 2B. Then, the knurl 100 is so driven by an unillustrated motor as to make forward/reverse revolutions.

Revolving the revolver in the forward direction (the knurl 100 is revolved clockwise in FIG. 2A) makes it possible to sequentially switch over the objective lens passing through an optical path of the microscope from the address-1 lens having the minimum magnification to the address-4 lens having the maximum magnification via the addresses 2, 3. Further, revolving the revolver in the reverse direction (the knurl 100 is revolved counterclockwise in FIG. 2A) makes it possible to sequentially switch over the objective lens passing though the optical path of the microscope from the address-4 lens having the maximum magnification to the address-1 lens having the minimum magnification via the addresses 3, 2.

Address detecting switches 110a–110d are disposed at equal intervals in the peripheral direction, corresponding to positions of the four objective lenses. Further, stop position detecting switches 120a–120d are, as illustrated in FIG. 2A, disposed at equal intervals in the peripheral direction of the knurl 100.

Further, as shown in FIG. 2B, two non-contact sensors 130, 140 are disposed in a face-to-face relationship with the address detecting switches 110a–110d and the stop position detecting switches 120a–120d.

Thus, an item of address data recorded in each address detecting switch is read by the sensor 130, thereby making it possible to detect an address of the mounting portion mounted with the objective lens located in the optical path of the microscope, i.e., a type of objective lens disposed on the optical path.

Further, the sensor 140 reads an item of stop position data recorded in the stop position detecting switch, thereby making it possible to detect the fact that the objective lens has reached a predetermined position in the optical path of the microscope.

A detection device constructed by a combination of the above detecting switch and the non-contact sensor may involve the use of a micro switch, a photoelectric sensor and a magnetic sensor.

The device shown in FIG. 1 includes a command-of-revolution operating unit 1 for giving a command of revolution to the revolver. The command-of-revolution operating unit 1 has two switches 11, 12, and the revolver revolves in the forward direction when depressing the forward revolution indicating switch 11. That is, the objective lens disposed in the optical path of the microscope can be switched over gradually from the minimum-magnification objective lens to the higher-magnification objective lenses.

When depressing the reverse revolution indicating switch 12, the revolver revolves in the reverse direction. That is, the objective lens disposed in the optical path of the microscope can be switched over gradually from the maximum-magnification objective lens to the lower-magnification objective lenses.

The command-of-revolution signals transmitted from the switches 11, 12 are inputted respectively to a forward revolution trigger pulse side of a trigger pulse generating unit 3 and a reverse revolution trigger pulse side thereof via a forward revolution signal transmitting transistor 22 and a reverse revolution signal transmitting transistor 23 of a command signal processing unit 22. The trigger pulse generating unit 3 generates a short single pulse at a fall of each input signal. A forward revolution flip-flop 41 of a revolution signal holding unit 4 and a reverse revolution flip-flop 42 are set by this pulse.

A motor driver 61 of a motor driving unit 6 causes the forward/reverse revolutions of a motor 62 and, in turn, the revolver on the basis of an output signal from the revolution signal holding unit 4.

Note that when the non-contact sensor 140 detects any one of the above stop position detecting switches 120a–120d, a switch 71 of a stop-of-revolution signal generating unit 7 is closed. Then, a single pulse signal assuming a low level is outputted from a pulse generator 72, and both of the forward revolution flip-flop 41 and the reverse revolution flip-flop 42 are reset, thereby stopping the motor 62.

At this time, any objective lens is located and stopped in the optical path of the microscope. Accordingly, address signals encoded by the address detecting switches 51, 52, 53 of the address detecting unit 5 are inputted to a decoder 54. Note that the address signal, as stated above, indicates an address, i.e., a type of the objective lens located on the optical path of the microscope.

Among respective output signals of the decoder 54, a low-level output signal indicating that the objective lens located in the optical path of the microscope is the minimum-magnification lens is transmitted to a base of the reverse revolution signal transmitting transistor 23 via a diode 24.

Hence, if the objective lens located in the optical path of the microscope is the minimum-magnification lens, a base electric potential of the reverse revolution signal transmitting transistor 23 decreases, and, therefore, the signal from the reverse revolution indicating switch 12 is not transmitted to the trigger pulse generating unit 3. That is, if the objective lens located in the optical path of the microscope is the minimum-magnification lens, the switchover from the minimum-magnification lens to the maximum-magnification lens is not executed even when depressing the reverse revolution indicating switch 12.

On the other hand, a base of the forward revolution signal transmitting transistor 22 is connected to the reverse revolution indicating switch 12, while a base of the reverse revolution signal transmitting transistor 23 is connected to the forward revolution indicating switch 11.

When simultaneously depressing both the forward revolution indicating switch 11 and the reverse revolution indicating switch 12, there is prevented such a situation that both the forward revolution flip-flop 41 and the reverse revolution flip-flop 42 are set with the result that the motor 62 is halted.

Further, the low-level output signal from the decoder 54 is inputted also to a NAND gate 21. Connected, moreover, to the NAND gate 21 are the forward revolution indicating switch 11 and the reverse revolution indicating switch 12 while being pulled up by resistors 26, 27, respectively. Then, an output signal from the NAND gate 21 is inputted to the reverse-revolution trigger pulse generating side of the trigger pulse generating unit 3.

As described above, if the objective lens located in the optical path of the microscope is the minimum-magnification lens, the command signal is not transmitted to the trigger generating unit 3 even when depressing only the reverse revolution indicating switch 12, and consequently the revolver is not revolved reversely.

Herein, when depressing both the forward revolution indicating switch 11 and the reverse revolution indicating switch 12, all three inputs of the NAND gate 21 assume the low level, and the output thereof also assumes the low level. In consequence of this, it seems as if there is developed the same state as transmitting the signal from the reverse revolution indicating switch 12 to the trigger pulse generating unit 3. Then, the trigger pulse generating unit 3 generates the reverse revolution trigger pulse, and the switchover from the minimum-magnification lens to the maximum-magnification lens can be done. In other words, the operation with a special consideration of the operator is conducted, whereby the switchover from the minimum-magnification lens to the maximum-magnification lens can be exceptionally done.

Note that the signals from the base and from the emitter of the reverse revolution signal transmitting transistor 23 are connected to a negative input AND gate (unillustrated), and an LED and a buzzer, etc. may be connected to an output of this AND gate. With this construction, a warning is given when depressing the reverse revolution indicating switch 12 if the objective lens located in the optical path of the microscope is the minimum-magnification lens. The operator of the microscope can be thus informed of an invalid input.

Figure 3:
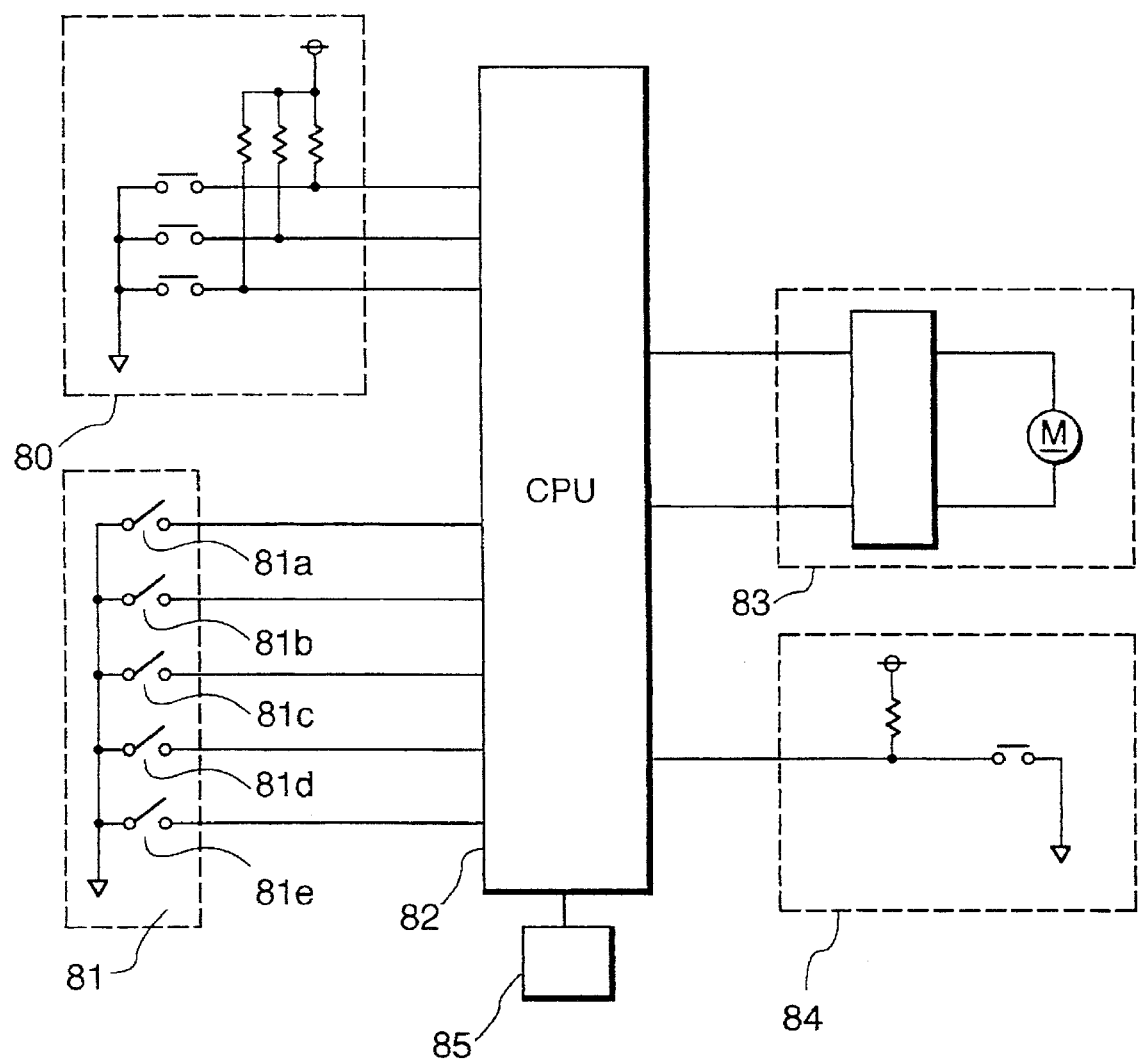
FIG. 3 is a block diagram showing an internal construction of the revolver controller of the microscope in accordance with a second embodiment of the present invention.
Figure 4:
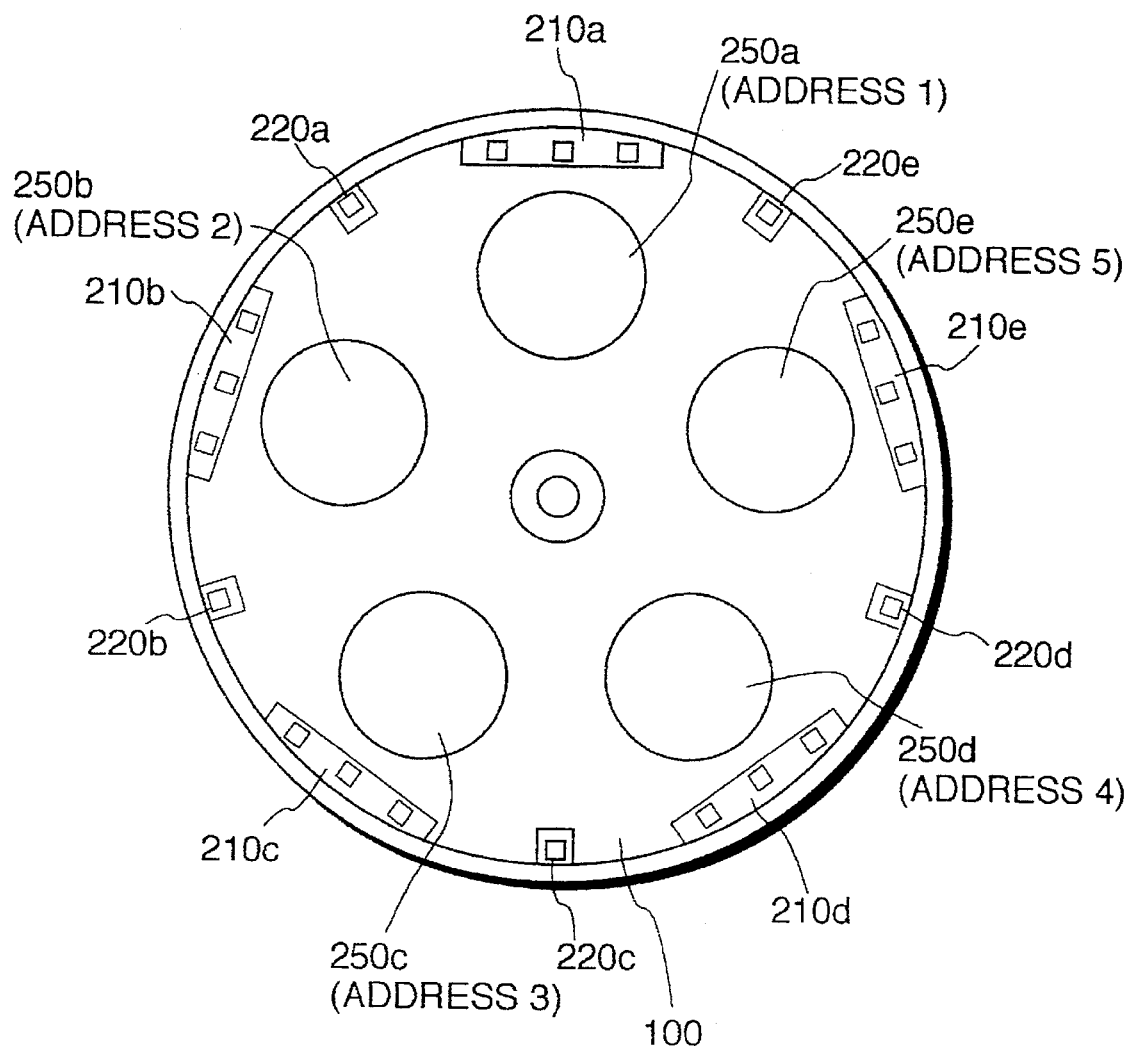
FIG. 4 is a view schematically illustrating a configuration of the revolver in the second embodiment.
Figure 5:
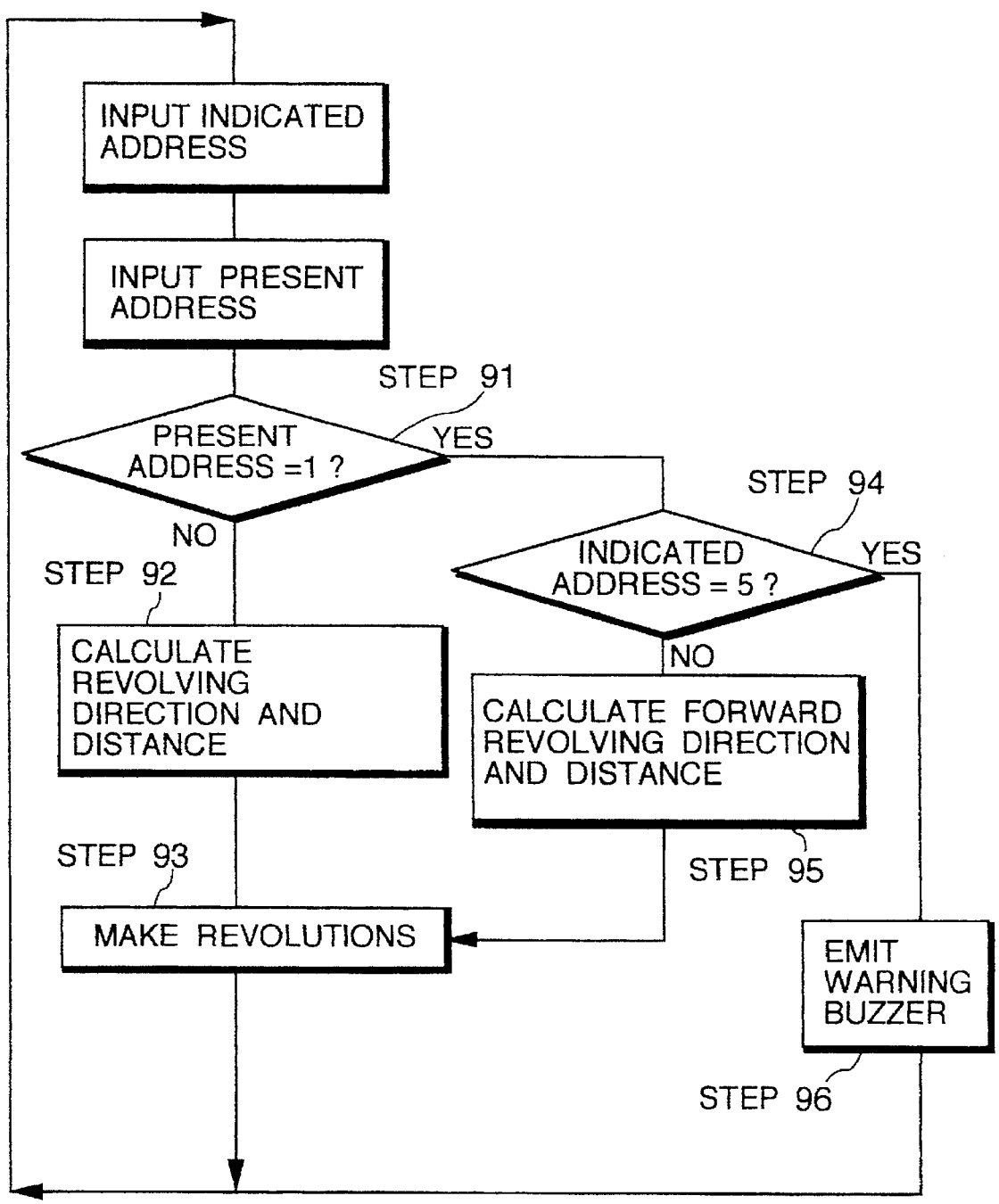
FIG. 5 is a flowchart showing operations of a CPU of FIG. 3.

FIG. 3 is a block diagram illustrating an internal construction of the revolver controller of the microscope in a second embodiment of the present invention. FIG. 4 is a view schematically illustrating the configuration of the revolver in this embodiment. Further, FIG. 5 is a flowchart showing operations of a CPU of FIG. 3.

Next, the second embodiment will be explained with reference to FIGS. 3, 4 and 5. This second embodiment is constructed such that a CPU 82 substitutes for the command signal processing unit 2, the trigger pulse generating unit 3 and the revolution signal holding unit 4 in the first embodiment discussed above. Note that the present invention is applied to the revolver including five mounting portions in this embodiment.

Referring to FIG. 3, an address indication operating unit 81 corresponds to the revolution indication operating unit 1 of FIG. 1; an address detecting unit 80 corresponds to the address detecting unit 5 of FIG. 1; a motor driving unit 83 corresponds to the motor operating unit 6 of FIG. 1; and a stop-of-revolution signal generating unit 84 corresponds to the stop-of-revolution signal generating unit 7 of FIG. 1.

Accordingly, the constructions and operations of the elements incorporating the same functions as those of the corresponding elements in the first embodiment will be omitted in the second embodiment.

In an apparatus of FIG. 3, the address detecting unit 80, the address indication operating unit 81, the motor driving unit 83, the stop-of-revolution signal generating unit 84 and a warning buzzer generation unit 85 are connected to the CPU 82. The CPU 82 controls the motor operating unit 83 and the warning buzzer generating unit 85 on the basis of the signals inputted from the address detecting unit 80, the address indication operating unit 81 and the stop-of-revolution signal generating unit 84.

The address indication operating unit 81 includes five switches. The individual switches correspond to addresses of the five objective lens mounting portions through which the revolver is mounted with the objective lenses.

Referring to FIG. 4, the knurl 100 serving as the body of the revolver includes five mounting portions 250a–250e provided at equal intervals, in which addresses are sequentially set. Five objective lenses having magnifications different from each other are mounted in these mounting portions 250a–250e in the peripheral direction in the sequence of the magnifications. In accordance with this embodiment in the same way as the preceding first embodiment, it is assumed that the objective lens having the minimum magnification is mounted in the address-1 mounting portion 250a; the objective lenses are mounted in the address-2 through address-4 mounting portions 250b–250d so that the magnification becomes gradually larger; and, thus, the objective lens having the maximum magnification is mounted in the address-5 mounting portion 250e. Address detecting switches 210a210e are disposed in the peripheral direction at equal intervals in the peripheral area of the knurl 100, corresponding to positions of the five objective lenses. Further, stop position detecting switches 220a–220e are, as illustrated in FIG. 4, disposed at equal intervals in the peripheral direction of the knurl 100.

Also, non-contact sensors 130, 140 (unillustrated), in the same way as the preceding first embodiment, read address data and stop position data of the address detecting switches 210a–210e and the stop position detecting switches 220a–220e.

Accordingly, when depressing a switch 81a among five switches 81a–81e of the address indication operating unit 81, the revolver is driven to revolve, whereby the address-1 lens having the minimum magnification is located in the optical path. Further, when depressing the switch 81e, the revolver is driven to revolve, whereby the address-5 lens having the maximum magnification is located in the optical path. Thus, by selecting one switch among switches 81a–81e, the indicated address, i.e., the address of the desired objective lens which is to be moved in the optical path of the microscope, can be inputted to the CPU 82.

Next, an operation of switching over the objective lens of the thus constructed revolver will be explained with reference to a flowchart of FIG. 5.

To start with, an address of a desired objective lens is inputted from the address indication operating unit 81 to the CPU 82. Inputted further from the address detecting unit 80 to the CPU 82 is an address signal indicating a type of the objective lens disposed at present in the optical path of the microscope.

The CPU 82 checks whether the present address is 1 or not (step 91).

If the present address is not 1, the CPU 82 calculates a shortest revolving direction and revolving distance to switch over the present address to an indicated address (step 92).

For instance, if the present address is 2, and the indicated address is 5 when the revolver is revolved in the forward direction the address 5 is reached through the addresses 3, 4 from the address 2. On the other hand, when the revolver is revolved in the reverse direction, the address 5 can be reached through only the address 1 from the address 2. In this instance, the CPU 82 determines that the revolver should be revolved in the reverse direction through only the two addresses.

Then, the CPU 82 controls the motor operating unit 83 on the basis of the revolving direction and revolving distance that are calculated in step 2 and thus causes the revolver to revolve (step 93).

The CPU 82, when determining that the present address is 1 in step 91, checks whether the indicated address is 5 or not (step 94).

The CPU 82, if the indicated address is not 5, calculates a revolving distance in the forward revolving direction to switch over the present address to the indicated address (step 95) and causes the revolver to revolve in the forward direction (step 93).

That is, if the present address is 1, the revolver is revolved in the forward revolving direction even when the revolving distance elongates so that the maximum-magnification objective lens does not pass through the optical path of the microscope.

In step 94, the CPU 82, if the indicated address is 5, transmits a signal to the warning buzzer generating unit 85 to emit a warning buzzer, and the operation of switching over the objective lens is thus ended (step 96).

That is, the apparatus does not work even by trying to effect the switchover to the maximum magnification when the minimum-magnification lens is disposed in the optical path of the microscope.

Incidentally, in this case, the address indication operating unit 81 may be operated so that the revolver is revolved, e.g., at first from the address 1 to the address 3, and, thereafter, the revolver is revolved from the address 3 to the address 5.

Thus, an arbitrary switch among the five switches 81a–81e of the address indication operating unit 81 is depressed to revolve the revolver in the shortest-distance revolving direction, whereby the desired objective lens can be located in the optical path. As discussed above, however, the apparatus does not work even by selecting the maximum-magnification lens when the minimum-magnification lens is disposed in the optical path. Further, when the minimum-magnification lens is disposed in the optical path, the desired objective lens is located in the optical path of the microscope by revolving the revolver in the forward revolving direction so that the maximum-magnification objective lens does not pass through the optical path of the microscope.

Figure 6:
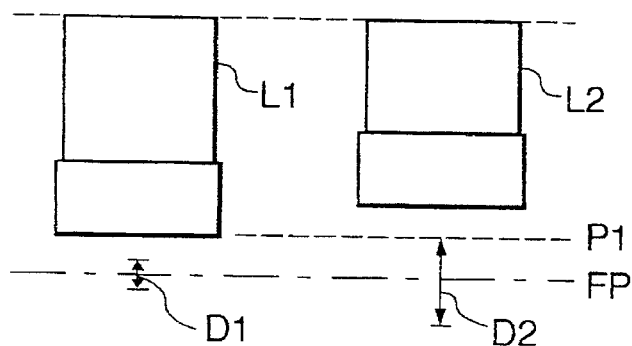
FIG. 6 is a diagram of assistance in explaining differences in terms of a length of a lens barrel and a focal depth between objective lenses due to a difference in magnification.

Further, in this embodiment, there has been considered only a relationship between the minimum- and maximum-magnification objective lenses. If there is an objective lens the lens barrel front edge of which is disposed within a focal depth of the minimum-magnification objective lens (see FIG. 6) in addition to the maximum-magnification objective lens, however, a construction may be such that a command of switching over the minimum-magnification objective lens to that objective lens is cut off.

It is apparent that, in this invention, a wide range of different working modes can be formed based on the invention without deviating from the spirit and scope of the invention. This invention is not restricted by its specific working modes except being limited by the appended claims.

What is claimed is:

1. A microscope comprising:
    a revolver on which are mounted at least three objective lenses having different magnifications;
    a driving device for revolving said revolver to dispose the objective lenses selectively in an optical path of said microscope;
    an operating device capable of producing drive commands for causing said driving device to switch the objective lens disposed in the optical path; and
    means for preventing execution of a specified drive command to switch the objective lens disposed in the optical path from one having a minimum magnification to one having a maximum magnification among said objective lenses.

2. A microscope according to claim 1, wherein said preventing means has a cut-off device for preventing transmission of the specified drive command to said driving device.

3. A microscope according to claim 1, further comprising:
    a detecting device for detecting magnification data of the objective lens disposed in the optical path, and
    wherein said preventing means discriminates the specified drive command based on magnification data detected by said detecting device.

4. A microscope according to claim 3, wherein said revolver has a plurality of mounting portions for mounting the objective lenses, and
    said detecting device has:
        a respective recorded area provided in the vicinity of each mounting portion and in which the magnification data of the objective lens mounted in that mounting portion is recorded; and
        a detector for reading the magnification data from the recorded area corresponding to the mounting portion of the objective lens disposed in the optical path.

5. A microscope according to claim 1, further comprising:
    a direction-of-revolution controlling device for revolving said revolver in such a direction that the objective lens having a maximum magnification does not pass through the optical path in switching the objective lens disposed in the optical path from the objective lens having the minimum magnification to another objective lens when said operating device produces a drive command other than the specified drive command.

6. A microscope according to claim 1, further comprising:
    a warning device for receiving drive commands from said operating device and giving a warning to an operator of said microscope in response to receiving the specified drive command.

7. A microscope according to claim 1, wherein said driving device has a motor and a motor drive for driving said motor,
    said preventing means has an arithmetic processing circuit, and
    said arithmetic processing circuit controls said motor drive to drive said motor in accordance with drive commands produced by said operating device but controls said motor drive so as not to drive said motor when said operating device produces the specified drive command.

8. A microscope comprising:
    a revolver on which are mounted at least three objective lenses having different magnifications;
    a driving device for revolving said revolver to dispose the objective lenses selectively in an optical path of said microscope;
    an operating device capable of producing drive commands for causing said driving device to switch the objective lens disposed in the optical path and means for preventing execution of a drive command to switch the objective lens disposed in the optical path from one having a maximum focal depth to one having a minimum focal depth among said objective lenses.

9. A microscope comprising:

a revolver on which are mounted at least three objective lenses having different magnifications;

a driving device for revolving said revolver to dispose the objective lenses selectively in an optical path of said microscope;

an operating device capable of producing drive commands for causing said driving device to switch the objective lens disposed in the optical path; and means for preventing execution of a drive command to switch the objective lens disposed in the optical path from one objective lens having a maximum focal depth among said objective lenses to another objective lens having a lens barrel front edge that would overlap with a range of positions defined by a focal depth of said one objective lens on the optical path.

10. A microscope comprising:

a revolver on which are mounted at least three objective lenses having different magnifications;

a driving device for revolving said revolver to dispose the objective lenses selectively in an optical path of said microscope;

an operating device capable of producing drive commands for causing said driving device to switch the objective lens disposed in the optical path; and means for preventing execution of a drive command to switch the objective lens disposed in the optical path from one objective lens to another objective lens having a portion that would overlap with a range of positions defined by a focal depth of said one objective lens on the optical path.

\* \* \* \* \*